US006773827B2

(12) United States Patent
Higuchi

(10) Patent No.: US 6,773,827 B2
(45) Date of Patent: Aug. 10, 2004

(54) ELECTRONIC COMPONENT, METHOD FOR PRODUCING ELECTRONIC COMPONENT, AND CIRCUIT BOARD

(75) Inventor: Shoichi Higuchi, Shiga-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 33 days.

(21) Appl. No.: 09/863,045

(22) Filed: May 22, 2001

(65) Prior Publication Data

US 2002/0001712 A1 Jan. 3, 2002

(30) Foreign Application Priority Data

May 24, 2000 (JP) ........................................ 2000-153629

(51) Int. Cl.$^7$ ............................ B32B 15/01; C25D 5/00; C22F 1/00
(52) U.S. Cl. ........................ 428/646; 428/648; 428/668; 428/680; 428/469; 428/901; 428/216; 361/305; 361/308.1; 174/250; 174/257; 148/537; 148/518
(58) Field of Search ............................ 428/646, 648, 428/668, 680, 469, 901, 216; 361/305, 308.1; 174/250, 257; 148/537, 518

(56) References Cited

U.S. PATENT DOCUMENTS

| | | | |
|---|---|---|---|
| 5,712,758 A | * | 1/1998 | Amano et al. ........... 361/321.2 |
| 6,195,248 B1 | | 2/2001 | Kunishi et al. |
| 6,373,683 B1 | * | 4/2002 | Higuchi et al. ............ 361/305 |

FOREIGN PATENT DOCUMENTS

| | | |
|---|---|---|
| JP | 62-29150 | 2/1987 |
| JP | 7-157893 | 6/1995 |
| JP | 7-268651 | 10/1995 |
| JP | 7-300696 | 11/1995 |
| JP | 11-1001793 | 1/1999 |
| JP | 11-189894 | 7/1999 |

OTHER PUBLICATIONS

Japanese Examination Report Issued Mar. 11, 2003 (w/ English translation of relevant portion).
Copy of the People's Republic of China Office Action dated Oct. 10, 2003 (and English translation of same).

* cited by examiner

Primary Examiner—Deborah Jones
Assistant Examiner—Ling Xu
(74) Attorney, Agent, or Firm—Dickstein, Shapiro, Morin & Oshinsky, LLP.

(57) ABSTRACT

An electronic component includes external electrodes formed on a base member, each external electrode including a plurality of layers of which the outermost layer is a tin plating layer. The tin plating layer has a polycrystalline structure, and atoms of a metal other than tin are diffused into the tin crystal grain boundaries. Alternatively, each external electrode includes a plurality of layers including a thick-film electrode formed on the base member, a nickel layer or a nickel alloy layer formed on the thick-film electrode and a tin plating layer formed on the nickel layer or the nickel alloy layer. The tin plating layer has a polycrystalline structure and nickel atoms are diffused into the tin crystal grain boundaries. Methods for fabricating electronic components and a circuit board provided with a plurality of electronic components are also disclosed.

18 Claims, 1 Drawing Sheet

ELECTRONIC COMPONENT, METHOD FOR PRODUCING ELECTRONIC COMPONENT, AND CIRCUIT BOARD

BACKGROUND OF THE INVENTION

1. Field of the Invention

The present invention relates to the structure of external electrodes of electronic components used for high-density mounting, and more particularly, the invention relates to an electronic component in which tin plating layers are formed as the outermost layers of the external electrodes.

2. Description of the Related Art

Electronic components, such as chip-type monolithic capacitors, are usually mounted on printed wiring boards, etc., by soldering the external electrodes formed on the exterior of chip base members. In such a case, in order to improve solderability relatively inexpensively, tin plating layers are often formed as the outermost layers of the external electrodes. This is because tin plating layers facilitate soldering as compared with nickel layers and copper layers, and also tin plating layers do not easily cause defects when the electronic components are mounted by reflow soldering, flow soldering, or the like.

However, a drawback of the tin plating layer is that, for example, if directly formed on a thick-film electrode provided on the surface of a ceramic base member, parts of the tin plating layer may not adhere to the thick-film electrode, or during soldering, the thick-film electrode may be melted and absorbed by the solder. In order to overcome such a drawback, a nickel underlying film or a nickel alloy underlying film is often formed under the tin plating layer.

Recently, it has become known that when an electronic component in which tin plating layers are formed as the outermost layers of the external electrodes is placed in an environment in which the temperature cyclically changes, whisker-like protrusions, which are called whiskers, are generated on the tin plating layers. The whiskers thus generated have a polycrystalline structure, have a length of approximately 100 $\mu$m at most and are curved, in contrast to the known linear single-crystal whiskers which are generated from tin plating layers formed on Cu-based underlying metals. Hereinafter, in order to distinguish from the single crystal whiskers, whiskers generated in an environment in which the temperature cyclically changes are referred to as "temperature cycle whiskers".

If such temperature cycle whiskers are generated on external electrodes of electronic components mounted on a circuit board, a short circuit may occur between adjacent components or between the individual components and wiring patterns. In particular, the mounting density of electronic components is rapidly increasing and in some cases, the distance between adjacent electronic components is as short as approximately 200 $\mu$m. The distances between the adjacent electronic components and between the individual components and wiring patterns will be further decreased as the mounting density of circuit components is further increased in the future, and therefore the possibility of a short circuit due to the temperature cycle whiskers will be increased even though the temperature cycle whiskers have a length of approximately 100 $\mu$m.

It is not possible to ignore an electrical short circuit on a circuit board having such a high mounting density.

As a method for suppressing temperature cycle whiskers, tin alloy plating layers are used. In view of satisfactory wettability and facilitation of plating, alloys of tin and lead are often used. However, use of lead is undesirable due to the adverse effect on the environment. On the other hand, alloying of tin with metals other than lead is still in the research stage and stable production thereof is not yet expected.

As another method for suppressing temperature cycle whiskers, use of metals other than tin or tin alloys is under study. For example, a method of using a gold plating layer or a lead plating layer as the outermost layers of the external electrodes is under study. However, since these materials are noble metals, there will be a significant increase in costs.

SUMMARY OF THE INVENTION

Accordingly, it is an object of the present invention to provide an electronic component provided with external electrodes in which temperature cycle whiskers are not generated even in an environment in which high temperature and low temperature alternate.

As a result of thorough studies, the present inventors have discovered that temperature cycle whiskers, which are generated on tin plating layers in an environment in which the high-temperature state and the low-temperature state are alternately repeated, are formed because tin atoms in the tin plating layers concentrate on specific spots using the stress caused by the changes in temperature as a driving force. That is, the tin plating layer has a polycrystalline structure, and tin atoms are considered to migrate to the surface of the tin plating layer along tin crystal grain boundaries. The present inventors have found that it is possible to inhibit tin atoms from migrating by diffusing atoms of a metal other than tin into the tin crystal grain boundaries, thus suppressing the generation of whiskers.

In one aspect of the present invention, an electronic component includes external electrodes formed on a base member, each external electrode including a plurality of layers, the outermost layer of the plurality of layers being a tin plating layer, in which the tin plating layer has a polycrystalline structure, and atoms of a metal other than tin are diffused into the tin crystal grain boundaries.

In the tin plating layer having such a structure, whiskers are not generated even in an environment in which the temperature repeatedly changes even if stress occurs in the tin plating layer due to a change in temperature since the migration of tin atoms along the tin crystal grain boundaries is inhibited.

Preferably, the atoms of the metal other than tin are nickel atoms. Preferably, a nickel layer or a nickel alloy layer is formed under the tin plating layer. The nickel layer or the nickel alloy layer is formed as an outer layer of the external electrode, and the tin plating layer is further formed on the nickel layer or the nickel alloy layer, and then the external electrode is heat-treated under predetermined conditions. Thereby, a part of the nickel atoms in the nickel layer or the nickel alloy layer can be easily diffused into the tin crystal grain boundaries.

In another aspect of the present invention, an electronic component includes external electrodes formed on a base member, each external electrode including a plurality of layers, the plurality of layers including a thick-film electrode formed on the base member, a nickel layer or a nickel alloy layer formed on the thick-film electrode, and a tin plating layer formed on the nickel layer or the nickel alloy layer, in which the tin plating layer has a polycrystalline structure and nickel atoms are diffused into the tin crystal grain boundaries.

In another aspect of the present invention, a method for fabricating an electronic component includes the steps of forming a thick-film electrode on a base member; forming a nickel layer or a nickel alloy layer on the thick-film electrode; forming a tin plating layer on the nickel layer or the nickel alloy layer so as to produce an external electrode composed of a metallic film having a layered structure; and heat-treating the external electrode under predetermined conditions. Thereby, a part of the nickel atoms in the nickel layer or the nickel alloy layer can be easily diffused into the tin crystal grain boundaries.

In an electronic component fabricated in accordance with the present invention, temperature cycle whiskers, which have a length of approximately 100 μm and which may be generated in an environment in which the temperature changes cyclically, are inhibited from occurring. Consequently, when a plurality of such electronic components are mounted on a circuit board, even if the distance between adjacent electronic components is decreased to 200 μm or less, the possibility of a short circuit caused by the temperature cycle whiskers is decreased, thus enabling high-density mounting.

DESCRIPTION OF THE PREFERRED EMBODIMENTS

An electronic component in an embodiment of the present invention will be described with reference to FIG. 1.

Figure 1:
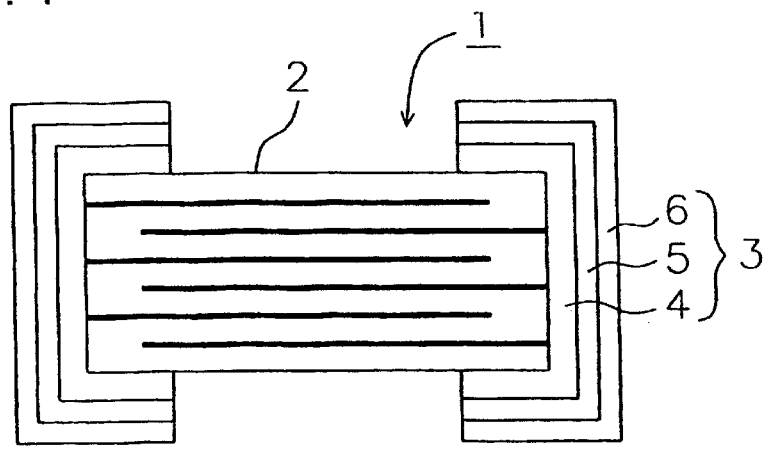
FIG. 1 is a sectional view of an electronic component in an embodiment of the present invention.

FIG. 1 is a sectional view of a chip-type monolithic ceramic capacitor 1, which includes a ceramic base member 2 and U-shaped external electrodes 3 provided on both sides of the ceramic base member 2. Each of the external electrodes 3 includes a thick-film electrode 4 in contact with the ceramic base member 2, a nickel plating layer 5 formed on the thick-film electrode 4, and a tin plating layer 6, outermost layer, formed on the nickel plating layer 5. The thick-film electrode 4 is formed by baking a silver paste, the nickel plating layer 5 is formed by electroplating nickel and the tin plating layer 6 is formed by electroplating tin. Additionally, the thick-film electrode 4 may be formed using a copper paste instead of the silver paste, and a nickel alloy plating layer may be formed instead of the nickel plating layer 5.

Next, a method for forming the nickel plating layers 5 and the tin plating layers 6 of the above-mentioned electronic component will be described in detail. First, the ceramic base member 2 provided with the thick-film electrodes 4 is dipped in a nickel plating bath, which is generally referred to as a Watts bath, and electroplating is carried out with a current density in a range of 0.1 to 10 A/dm$^2$, and thereby the nickel plating layers 5 in a thickness of about 1 to 10 μm are formed. The ceramic base member 2 is then dipped in a weakly acidic tin plating bath in which tin sulfate as a metal salt, citric acid as a complexing agent, and at least one of a quaternary ammonium salt and a surfactant containing alkylbetaine as a brightener are added, and electroplating is carried out with a current density in a range of 0.1 to 5 A/dm$^2$, and thereby the tin plating layers 6 in a thickness of about 2 to 10 μm are formed. Additionally, a metal salt other than tin sulfate may be used as long as the metal salt provides divalent tin ions. Furthermore, conducting agents and anti-oxidizing agents may be appropriately added to the nickel plating bath and the tin plating bath. Other conditions for plating may be appropriately changed within the scope not deviating from the object of the present invention.

The ceramic base member 2 in which layered metal films including the thick-film electrodes 4, the nickel layers 5 and the tin films 6 are thus formed is subjected to heat treatment at 85° C. for 1 hour so that nickel atoms in the nickel layers 5 are partially diffused into the tin crystal grain boundaries in the tin plating layers 6. Other diffusion temperatures may be used. The amount of diffusion of nickel atoms is in a range of about 0.001% to 1.0% by weight. If the amount of diffusion of metallic atoms is less than about 0.001% by weight, it is difficult to obtain the whisker-inhibiting effect and if the amount of diffusion exceeds about 1.0% by weight, the wettability of the tin plating layers is decreased, thus degrading the characteristics of external electrodes. The heat-treating conditions may be appropriately changed as long as the nickel atoms are diffused in the range described above.

Figure 2:
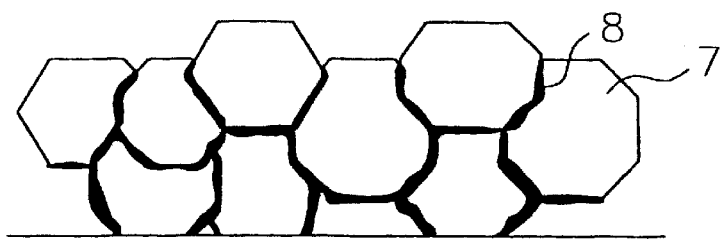
FIG. 2 is a sectional view showing a tin plating layer in the present invention.
Figure 3:
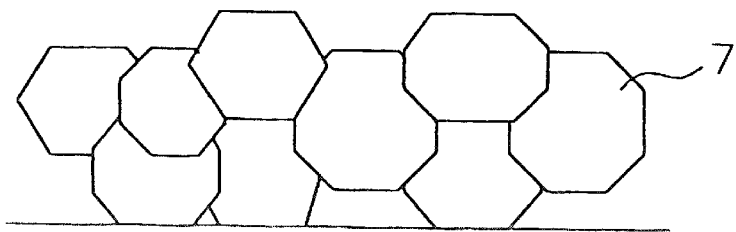
FIG. 3 is a sectional view showing a conventional tin plating layer.

A cross section of an electronic component provided with a tin plating layer 6 which was heat-treated as described above (Example) and a cross section of an electronic component provided with a tin plating layer 6 before heat treatment (Comparative Example) were observed with a scanning electron microscope (SEM). FIG. 2 is a representation of a sectional view of the tin plating layer 6 in the Example, and FIG. 3 is a representation of a sectional view of the tin plating layer 6 in the Comparative Example. As shown in the drawings, the tin plating layers 6 had a polycrystalline structure. In the Example, the state in which nickel atoms 8 were diffused into the grain boundaries of tin crystals 7 was confirmed, while in Comparative Example, diffusion of nickel atoms was not confirmed.

Next, after an electronic component provided with a tin plating layer 6 which was heat-treated as described above (Example) and an electronic component provided with a tin plating layer 6 before heat treatment (Comparative Example) were left in an environment in which the high-temperature state and the low-temperature state were alternately repeated, the occurrence of whiskers was checked. Specifically, the electronic components were left under the following conditions: a temperature change from −40° C. to 85° C., a retention time (including temperature increasing/decreasing time) of 30 minutes, a temperature increasing/decreasing time of 3 to 5 minutes, and the temperature cycle repeated 1,000 times, and then, using a scanning electron microscope (SEM), the whisker density on the tin plating layers 6 was observed. The results thereof are shown in Table 1.

TABLE 1

|  | Temperature Cycle Whisker Density (Number of whiskers/mm$^2$) |
| --- | --- |
| Example | 0 |
| Comparative Example | 1,000 |

As is obvious from the results described above, with respect to the electronic component in Example in which nickel atoms were diffused into the tin crystal grain boundaries of the tin plating layer by the heat treatment, it was confirmed that whiskers were inhibited from being generated on the tin plating layer even in an environment in which the high-temperature state and the low-temperature state were alternately repeated. In contrast, with respect to the electronic component in the Comparative Example, which was not subjected to heat treatment and in which nickel atoms were not diffused into the tin crystal grain boundaries of the tin plating layer, whiskers were generated in an environment in which the high-temperature state and the low-temperature state were alternately repeated.

The essential feature of the present invention lies in that temperature cycle whiskers are avoided by inhibiting tin atoms from migrating to the surfaces of tin plating layers along tin crystal grain boundaries. Although nickel atoms are diffused into the tin crystal grain boundaries by heat-treating the tin plating layer, under which a nickel plating layer may be formed, in the embodiment described above, the present invention is not limited thereto as long as nickel atoms can be diffused into the tin crystal grain boundaries. The atoms to be diffused into tin crystal grain boundaries are not limited to nickel atoms as long as the migration of tin atoms are inhibited, and for example, even when atoms of a transition metal other than nickel, such as cobalt, are diffused into the tin crystal grain boundaries, if the migration of the tin atoms is effectively suppressed, the temperature cycle whisker-inhibiting effect is considered to be obtained.

Although the chip-type monolithic ceramic capacitor has been described as the electronic component, the present invention is not limited thereto, and the present invention is also applicable to other chip-type electronic components, such as chip-type ceramic coils and chip-type ceramic thermistors.

What is claimed is:

1. An electronic component comprising:
   a base member; and
   an external electrode on the base member and comprising a plurality of layers,
   wherein the outermost layer of the external electrode relative to the base member comprises tin having a polycrystalline structure including tin crystal grains having boundaries, and having atoms of a metal other than tin at tin crystal grain boundaries, and
   wherein the metal other than tin comprises nickel.

2. An electronic component according to claim 1, wherein the external electrode has a layer comprising nickel or nickel alloy adjacent the tin layer.

3. An electronic component according to claim 2, wherein the external electrode comprises a thick-film electrode on the base member, the nickel containing layer on the thick-film electrode and the tin layer on the nickel containing layer.

4. An electronic component according to claim 3, wherein the tin layer has a thickness of about 2 to 10 $\mu$m and the metal other than tin is about 0.001 to 1 weight percent of the tin layer.

5. A circuit board having at least two electronic components according to claim 3 mounted thereon such that the distance between the two electronic components is about 200 $\mu$m or less.

6. A circuit board having at least two electronic components according to claim 2 mounted thereon such that the distance between the two electronic components is about 200 $\mu$m or less.

7. A circuit board having at least two electronic components according to claim 1 mounted thereon such that the distance between the two electronic components is about 200 $\mu$m or less.

8. An electronic component comprising:
   a base member; and
   an external electrode on the base member and comprising a plurality of layers,
   wherein the outermost layer of the external electrode relative to the base member comprises tin having a polycrystalline structure including tin crystal grains having boundaries, and having atoms of a metal other than tin at tin crystal grain boundaries, and
   wherein the external electrode comprises a nickel or nickel alloy layer adjacent the tin layer.

9. An electronic component according to claim 8, wherein the external electrode comprises a thick-film electrode on the base member, the nickel containing layer on the thick-film electrode, and the tin layer on the nickel containing layer.

10. An electronic component according to claim 9, wherein the tin layer has a thickness of about 2 to 10 $\mu$m and the metal other than tin is about 0.001 to 1 weight percent of the tin layer.

11. A circuit board having at least two electronic components according to claim 8 mounted thereon such that the distance between the two electronic components is about 200 $\mu$m or less.

12. An electronic component comprising:
    a base member; and
    an external electrode on the base member and comprising a plurality of layers,
    wherein the outermost layer of the external electrode relative to the base member comprises tin having a polycrystalline structure including tin crystal grains having boundaries, and having atoms of a metal other than tin at tin crystal grain boundaries, and
    wherein the external electrode comprises a thick-film electrode on the base member, a nickel containing layer on the thick-film electrode, and the tin plated layer on the nickel containing layer.

13. A circuit board having at least two electronic components according to claim 12 mounted thereon such that the distance between the two electronic components is about 200 $\mu$m or less.

14. An electronic component comprising:
    a base member; and
    an external electrode on the base member and comprising a plurality of layers,
    wherein the outermost layer of the external electrode relative to the base member comprises tin having a polycrystalline structure including tin crystal grains having boundaries, and having atoms of a metal other than tin at tin crystal grain boundaries, and
    wherein the tin layer has a thickness of about 2 to 10 $\mu$m and the metal other than tin is about 0.001 to 1 weight percent of the tin layer.

15. A circuit board comprising:
    at least two electronic components mounted thereon such that the distance between the two electronic components is about 200 $\mu$m or less, wherein the at least two electronic components each comprise:
    a base member; and
    an external electrode on the base member and comprising a plurality of layers,
    wherein the outermost layer of the external electrode relative to the base member comprises tin having a polycrystalline structure including tin crystal grains having boundaries, and having atoms of a metal other than tin at tin crystal grain boundaries.

16. A method of fabricating an electronic component by forming at least one external electrode on a base member, the external electrode comprising a plurality of layers of which the outermost layer relative to the base member is a tin layer having a polycrystalline structure including crystal grains having boundaries, the improvement which comprises diffusion heat treating the tin layer in the presence of a metal other than tin so as to diffuse the metal other than tin into the tin crystal grain boundaries, wherein the metal other than tin comprises nickel.

17. A method according to claim 16, wherein the external electrode has a nickel or nickel alloy layer adjacent the tin layer.

18. A method according to claim 17, wherein the external electrode comprises a thick-film electrode which is disposed on the base member.

* * * * *